United States Patent
Ford et al.

(10) Patent No.: US 8,949,011 B2
(45) Date of Patent: Feb. 3, 2015

(54) HELICOPTER SHIP BOARD LANDING SYSTEM

(75) Inventors: Tom Ford, Alberta (CA); Michael Boloye, Alberta (CA)

(73) Assignee: NovAtel Inc., Calgary (CA)

( * ) Notice: Subject to any disclaimer, the term of this patent is extended or adjusted under 35 U.S.C. 154(b) by 729 days.

(21) Appl. No.: 11/520,212

(22) Filed: Sep. 13, 2006

(65) Prior Publication Data

US 2010/0228408 A1    Sep. 9, 2010

Related U.S. Application Data (60) Provisional application No. 60/716,897, filed on Sep. 14, 2005.

(51) Int. Cl.
*G05D 1/02* (2006.01)
*G01C 21/00* (2006.01)
(Continued)

(52) U.S. Cl.
CPC .............. *G01C 21/28* (2013.01); *G01C 21/165* (2013.01); *G01S 19/04* (2013.01); *G01S 19/15* (2013.01);
(Continued)

(58) Field of Classification Search
CPC ......... G01S 19/15; G01S 19/26; G01S 19/42; G01S 19/43; G01S 19/45; G01S 19/47; G01S 19/48; G01S 19/49; G01S 19/51; G01S 5/0009; G01S 5/0027; G01S 5/0036; G01S 5/0072; G01S 5/0263; G01S 5/0284; G01S 5/06; G01C 21/18; G01C 21/20; G01C 21/28; G05D 1/0653; G05D 1/0661; G05D 1/0676; G05D 1/0684
USPC ..................... 701/1, 3, 16–18, 200, 201, 207, 701/213–217, 300, 302, 400, 401, 468–469, 701/472–473, 484–485, 500–505, 512; 340/946–952; 342/33, 357.06, 342/357.08–357.14, 357.2, 357.25–357.3, 342/357.34–357.36, 357.53; 73/178 R, 73/178 H, 178 T
See application file for complete search history.

(56) References Cited

U.S. PATENT DOCUMENTS

| 4,259,658 | A | | 3/1981 | Basov et al. |
| 4,995,722 | A | * | 2/1991 | Sutour ..................... 356/139.03 |

(Continued)

FOREIGN PATENT DOCUMENTS

JP    6247394    *  9/1994    ............. B64D 45/04

OTHER PUBLICATIONS

Wanniger, Lambert: "Introduction to Network RTK", IAG Working Group 4.5.1: Network RTK, http:/www.network-rtk.info/intro/introduction.html, Jun. 11, 2004, pp. 1-5.
(Continued)

*Primary Examiner* — Jack W Keith
*Assistant Examiner* — Chuong P Nguyen
(74) *Attorney, Agent, or Firm* — Cesari and McKenna, LLP; Patricia A. Sheehan (57) ABSTRACT

A system for maneuvering an aircraft for operations in connection with a sea-going vessel, the vessel having a designated area for landings and sling-load operations. Each of the aircraft has a navigation unit (INU) comprising a GPS receiver and an inertial navigation unit. The INU's are updated by data from the GPS receivers and the data from the shipboard unit's GPS receiver and INU are transmitted to the aircraft. The aircraft performs RTK calculations to determine a vector to the shipboard GPS antennas and modifies the vector with data from the INU's.

22 Claims, 4 Drawing Sheets

(51) Int. Cl.
  *G01S 19/00* (2010.01)
  *G01C 21/28* (2006.01)
  *G01C 21/16* (2006.01)
  *G01S 19/04* (2010.01)
  *G01S 19/15* (2010.01)
  *G05D 1/06* (2006.01)
  *G05D 1/10* (2006.01)
  *G08G 5/00* (2006.01)
  *G08G 5/02* (2006.01)
  *G01S 19/26* (2010.01)

(52) U.S. Cl.
  CPC .............. *G05D 1/0684* (2013.01); *G05D 1/102* (2013.01); *G08G 5/0013* (2013.01); *G08G 5/025* (2013.01); *G01S 19/26* (2013.01)
  USPC ........... 701/300; 701/468; 701/469; 701/472; 701/473; 701/500; 342/33; 342/357.2; 342/357.23; 342/357.3; 342/357.32; 342/357.34; 342/357.53

(56) References Cited

U.S. PATENT DOCUMENTS

| | | | | |
|---|---|---|---|---|
| 5,235,513 | A * | 8/1993 | Velger et al. | 701/16 |
| 5,287,104 | A * | 2/1994 | Shemwell | 340/952 |
| 5,438,337 | A * | 8/1995 | Aguado | 342/357.48 |
| 5,898,680 | A | 4/1999 | Johnstone et al. | |
| 5,991,691 | A * | 11/1999 | Johnson | 701/470 |
| 6,064,924 | A * | 5/2000 | Fleischmann | 701/16 |
| 6,114,975 | A * | 9/2000 | Guillard | 340/945 |
| 6,553,311 | B2 | 4/2003 | Ahearn et al. | |
| 7,693,617 | B2 * | 4/2010 | Dockter et al. | 701/3 |
| 2005/0033489 | A1 * | 2/2005 | Tezuka | 701/16 |
| 2005/0125142 | A1 * | 6/2005 | Yamane | 701/200 |
| 2007/0016371 | A1 * | 1/2007 | Waid et al. | 701/213 |
| 2007/0021878 | A1 * | 1/2007 | Builta et al. | 701/7 |
| 2008/0071431 | A1 * | 3/2008 | Dockter et al. | 701/3 |
| 2008/0088504 | A1 * | 4/2008 | Dutton | 342/357.04 |
| 2011/0006164 | A1 * | 1/2011 | Martensson et al. | 244/183 |

OTHER PUBLICATIONS

Wegener, Volker and Wanniger, Lambert: "Communication Options for Network RTK", IAG Working Grouop 4.5.1: Newtork RTK, http:\www.network-rtk.info/wegener/commuunciation.html, Feb. 3, 2005, pp. 1-4.

Ford, Tom J. and Janet Neumann, *NovAtel's RT20—A Real Time Floating Ambiguity Positioning System*, Proceedings of ION GPS-94, Salt Lake City, Utah, Sep. 20-23, 1994, The Institute of Navigation, Washington, D.C. pp. 1067-1076.

Neumann, Janet Brown et al., *Test Results from a New 2 cm Real Time Kinematic GPS Positioning System*, Proceedings of ION GPS-96, Kansas City, Missouri, Sep. 17-20, 1996, 10 pgs.

Neumann, Janet Brown et al., *Real-Time Carrier Phase Positioning Using the RTCM Standard Message Types 20/21 and 18/19*, Proceedings of ION GPS '97, Kansas City, Missouri, Sep. 17-20, 1997, The Institute of Navigation, Washington, D.C. pp. 857-866.

Ford, Tom J. et al., *OEM4 Inertial: A Tightly Integrated Decentralised Inertial/GPS Navigation System*, Proceedings of ION GPS 2001, Salt Lake City, Utah, 11 pgs.

Ford, Tom et al., *OEM4 Inertial/GPS Navigation System on the OEM4 Receiver*, Proceedings of 2001 International Symposium on Kinematic Systems in Geodesy, Geomatics and Navigation, Banff, Alberta, 19 pgs.

* cited by examiner

HELICOPTER SHIP BOARD LANDING SYSTEM

CROSS-REFERENCE TO RELATED APPLICATIONS

The present application claims the benefit of U.S. Provisional Patent Application Ser. No. 60/716,897, which was filed on Sep. 14, 2005, by Thomas J. Ford for a HELICOPTER SHIP BOARD LANDING SYSTEM and is hereby incorporated by reference.

BACKGROUND OF THE INVENTION

1. Field of the Invention

This invention relates to the navigation of an aircraft (fixed wing or helicopter) relative to ships at sea.

More specifically, it relates to the takeoff, landing and sling load re-supply operations involving a helicopter and a sea-going vessel.

2. Background Information

Shipboard helicopter operations provide a difficult operational environment. Wind over the deck and wake turbulence shed by the ship super structure offer challenging and unpredictable conditions during takeoff and landing. This is especially true in the operational environment that includes sea-state six, with associated twenty-foot and thirty-three knot winds. Anything other than calm seas can create pitch, roll, yaw and heave of the landing platform. Different sea-going vessels behave in a variety of ways due to their size, hull design, stabilization systems, etc. Of particular concern in this environment is the performance consistency of helicopter operations involving ship-based platforms. A helicopter pilot operating off such a platform must observe the heave, pitch, and roll motion of the landing platform and determine the landing contact time based on and roll motion of the landing platform and determine the landing contact time based on human reaction time as well as aircraft performance. The invention is directed to this difficult task.

Landing approaches are made either from directly behind the moving platform or from an angle off to the left or right, generally 45 degrees to the direction of ship travel. The aircraft heading will either be adjusted to be that of the ship, or will remain at a 45 degree angle to the ship heading to avoid pointing weapons at the ship super structure. Maneuvering the aircraft over the heli-deck from behind the ship involves a forward cyclic control input and appropriate directional control inputs to maintain desired heading. If the aircraft has been pre-positioned to the side of the ship, a lateral cyclic control input is made to effect a side-step motion, with directional control inputs as necessary to maintain desired heading. In either case, the collective control is adjusted to accommodate the power requirement to maintain altitude. For a ship having a nominal 25 foot deck height above water, transitioning from a hover 35 feet above water to 10 feet above a solid deck surface produces a noticeable change in hover power required. During heaving sea conditions with the landing deck moving several feet up and down, the helicopter must pick a power setting that will maintain a safe distance above the landing deck, while accepting some variation in true altitude relative to the landing deck, rather than constantly modulate collective power in an effort to always maintain a constant height above deck altitude.

Helicopter landing approaches to moving ships are performed in various ways but have several elements in common. First the helicopter makes an approach to a point in space either behind or adjacent to the heli-deck, coming to a stabilized hover approximately 2 main rotor diameters away from the edge of the platforms, and perhaps 10 feet above the platform at its highest heave elevation. Once the helicopter is in a stable hover condition (essentially formation flight with the vessel to be landed on), the motion of the landing deck is evaluated to determine an adequate period of quiescence, during which a safe landing can be made. As this motion is evaluated, the helicopter is carefully maneuvered into a position above the center of the landing deck, maintaining an average position of perhaps 10 feet above the deck. When the decision is made to land, the horizontal position over the heli-deck is maintained, and power is reduced to facilitate a rapid, firm landing during the period of quiescence, which may last as little as 5 seconds. Upon touchdown, systems such as a Harpoon device are employed to firmly clamp the helicopter to the heli-deck.

SUMMARY OF THE INVENTION

The invention makes use of a relative navigation system consisting of pair of Inertial Navigation Units along with Differential Global Positioning Systems (IDGPS) communicating with standard RTCA messages. A fixed-integer carrier based solution enables the relative system to reduce the uncorrelated low latency position error between the two systems to less than 50 cm. A ship-based inertial guidance unit provides its position, attitude, pseudorange and carrier measurements, as well as the position of an eccentric point (the landing pad) to the helicopter-based unit. The helicopter unit generates a precise carrier-based vector between its own antenna and the GPS antenna on the ship and uses this to compute a GPS position that has a high accuracy relative to the ship-based GPS antenna. This in turn is used to update an inertial guidance unit in the helicopter so that a low-latency position can be generated by the latter unit. From this, a high-accuracy, low-latency relative position is generated at the helicopter, along with the relative motion and attitude data required for safe and consistent landing or slinging operations.

The navigation system consists of a pair of GPS/INS systems, one on the ship and one on the helicopter. Each GPS/INS system can generate continuous position and attitude information at a 100 Hz output rate. They can also provide the position of an eccentric point (i.e. the TDP) at the same rate. The INS errors are controlled with GPS positions that can be either single point, differentially corrected or derived from the receiver's RTK (Real Time Kinematics) process. In the offshore environment of RTK arrangements, there is no stationary base station from which differential corrections can be generated, so the controlling positions have to be either single point, single point transferred with a precise baseline vector, or inertial transferred with a precise baseline vector. For the sake of brevity, these three control methods will be referred to as Independent Single Point (ISP), Transferred Single Point (TSP) and Transferred Inertial (TI) methods. In the ISP method, each inertial system is controlled with single point GPS. The various error sources for both GPS systems have different amounts of correlation, from high in the case of satellite and atmospheric errors to low in the case of multipath and noise. But the inherent inertial filtering effectively damps the effect of the noise on both. Therefore, the relative positions between the two systems exhibit an error that is less than single point accuracy alone, e.g. sub-meter.

The TSP and TI methods both require a reliable means of transferring the position of the base coordinates to the aircraft. In order to obtain an accurate translation vector, an to RTK baseline is determined between the two GPS antennas.

Typically, the RTK process expects pseudorange and carrier measurements that have been observed at a stationary base station receiver. Since the base station is stationary, its carrier observations can be easily modeled to provide the remote receiver with the capability of generating high rate low latency RTK positions. If the base station is moving the base station observations cannot be effectively modeled, but the measurements taken at the base station can be combined with remote receiver observations to generate low-rate higher latency RTK positions.

In the TSP method, the RTK translation vector is applied to the single point position obtained at the base station receiver. This translated position is used to control the inertial system at the rover GPS/INS system. The controlling noise at the two INS units will be identical and the resulting output noise, after passing through the inertial filter, will be very nearly the same. Differences will occur because the INS systems are slightly different, and because the dynamics on the ship and on the helicopter are different.

In the TI method, which is the subject of this invention, the RTK translation vecfor is applied to the filtered INS estimate of the base station antenna position. This is a noise-reduced position with some coloring on the position errors. Tests have shown that in typical open sky tracking, the RMS of the INS position errors is at the meter level when the inertial system is controlled with single point positions. Any translated positions will have the same noise level and coloring. The advantage of this method over the other two is that the remote INS on the helicopter does not have to track high-frequency errors. Instead, the object is to weight the controlling (translated) positions at the helicopter's GPS/INS such that the resulting filtered INS positions there have the same error characteristics as at the moving base station. In this way the positions at the two locations will be accurate relative to one another.

Figure 4:
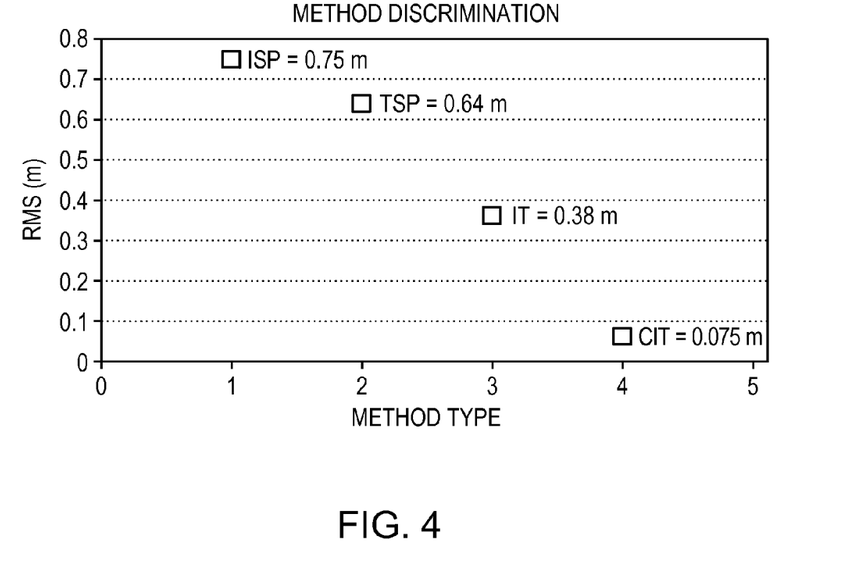
FIG. 4 is a diagram illustrating the relative accuracies of different arrangements for ascertaining the position of an aircraft relative to a location on a ship.

With the preferred TI method, it is possible to reduce the relative error from the level dictated by the two inertial systems. The inertial errors at both systems are slowly varying (typically at a rate less than a few centimeters per second). Therefore the relative error between the two systems is also slowly varying and, if measured after the inertial update, can be used to remove the bulk of the relative error over a small (one second) interval to follow. In order to do this, the post update remote position is differenced with the base station position (also post update at the moving base station). This vector is differenced from the RTK moving baseline vector to obtain a post update inertial position correction. This correction is applied to the inertial output at the remote system. The results of this correction are dramatic as will be seen in FIG. 4, where the corrected TI is called "CIT". To reiterate, the post-update position difference is subtracted from the computed RTK vector to form a post-update position correction. The correction is added to the inertial positions at the rover after they have been generated by the inertial system (raw measurements converted to the ECEF frame and integrated to generate velocity and position). The corrections are not used to modify the position of the inertial system, but only the output of the inertial system. This is a subtle but important distinction.

The method used to generate the accurate linking vector involves using the carrier measurements from the two GPS receivers is a modified RTK algorithm. The RTK algorithm solves for the carrier ambiguities of the double differenced carrier measurements collected at the two GPS receivers. It produces a vector that has a typical accuracy of 2 cm., linking the two GPS antennas used to collect the carrier measurements. Usually the stationary receiver (the base) transmits its position and carrier measurements to the moving receiver (the rover). The rover matches the transmitted carrier measurements with its measured carrier measurements and uses these to compute the baseline vector. Once this is generated, the vector is added to the transmitted base station position to produce a position with excellent accuracy relative to the moving base station position.

Because both receivers are moving and the only reliable vector available coincides with the even second mark at which time actual measurements (rather than a modeled base station measurement and a measured rover measurement) from both receivers are available, the position used to update the helicopter Kalman filter has some latency associated with it. The timing in the inertial Kalman update at the rover system is slightly delayed to accommodate this latency. In addition, the timing used to generate the updated rover position (base plus vector) is such as to ensure that both quantities (base to position and linking vector) have the same time tag.

For a normal RTK system that has a stationary base station, the base position is transmitted at a low rate, for example, once ever 30 seconds or so. The transmitted position is usually entered as a "fixed" position in the base receiver. In the present case, however, the base station position transmitted is the filtered inertial position controlled by a single point GPS. It is transmitted once per second. This is the same rate as the transmitted carrier measurements. The messages are encoded as standard RTCA messages.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
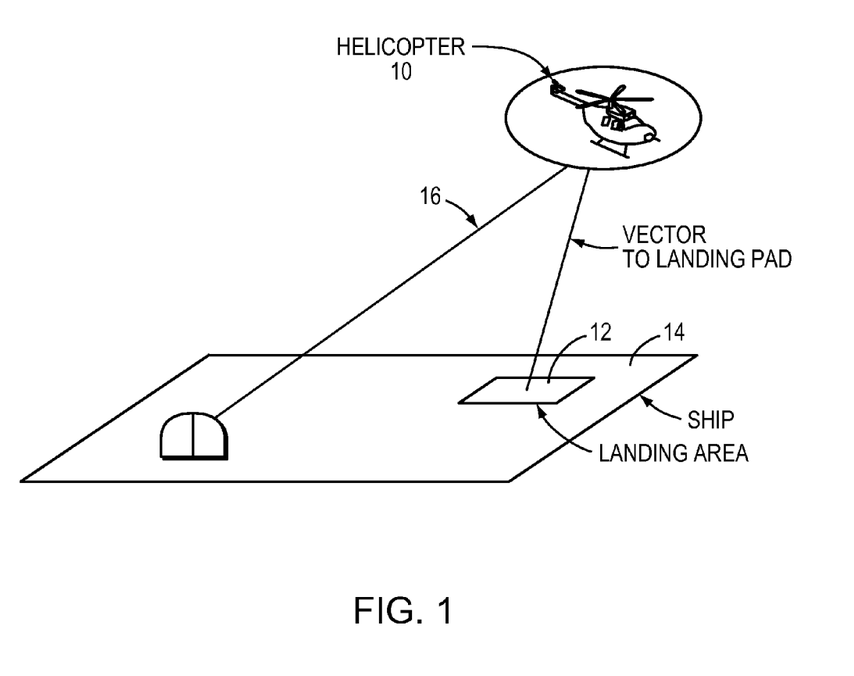
FIG. 1 is a diagram of a system for landing an aircraft on the deck of an ocean-going vessel.

As shown in FIG. 1, the invention relates to the positioning of an aircraft 10, such as a helicopter, for landing on a designated pad 12 on the deck 14 of a sea going vessel. Both the ship and the aircraft have navigation arrangements described herein and they are provided with a wireless link 16 for transmission of data from the ship to the aircraft.

Figure 2:
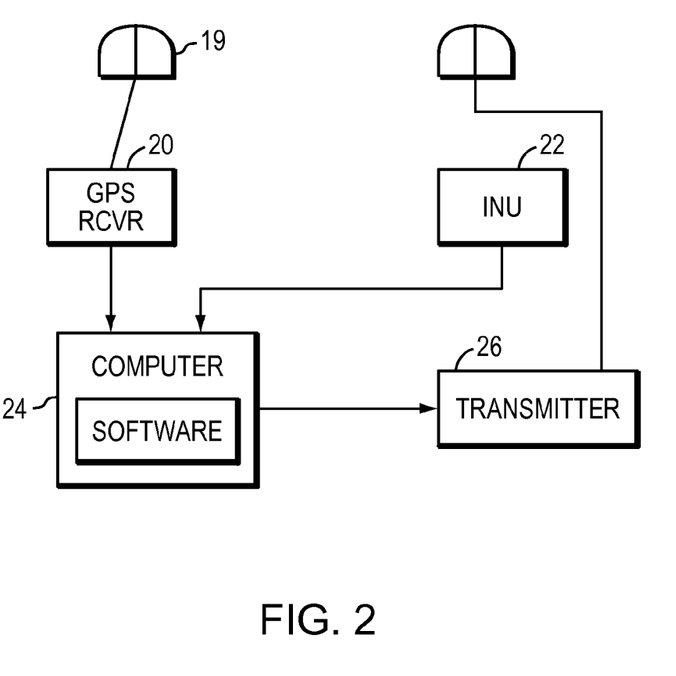
FIG. 2 is a diagram of a ship-board navigation unit used in the system of FIG. 1.

With reference to FIG. 2, the ship carries a navigation unit 18 comprising a GPS antenna 19, a GPS receiver 20, an inertial navigation unit (INU) 22, a computer 24 and an RTK transmitter 26. The GPS receiver 20 provides position readings but at a rate that is to too low for the operations contemplated by the invention. These readings are used by the computer 24 to update the INU 22, which is subject to long term drift but provides position data at a relatively high rate. An arrangement for integrating an INU with a GPS receiver is described in "OEM4 Inertial: An Inertial/GPS Navigation System on the OEM4 Receiver", Proceedings of the International Symposium on Kinematic Systems in Geodesy, Geomatics and Navigation (KIS), Banff, Alberta, September 2001, by Ford et al. GPS RTK (Real Time Kinematics) information and INU 22 readings are transmitted to the aircraft over the wireless link 16.

Figure 3:
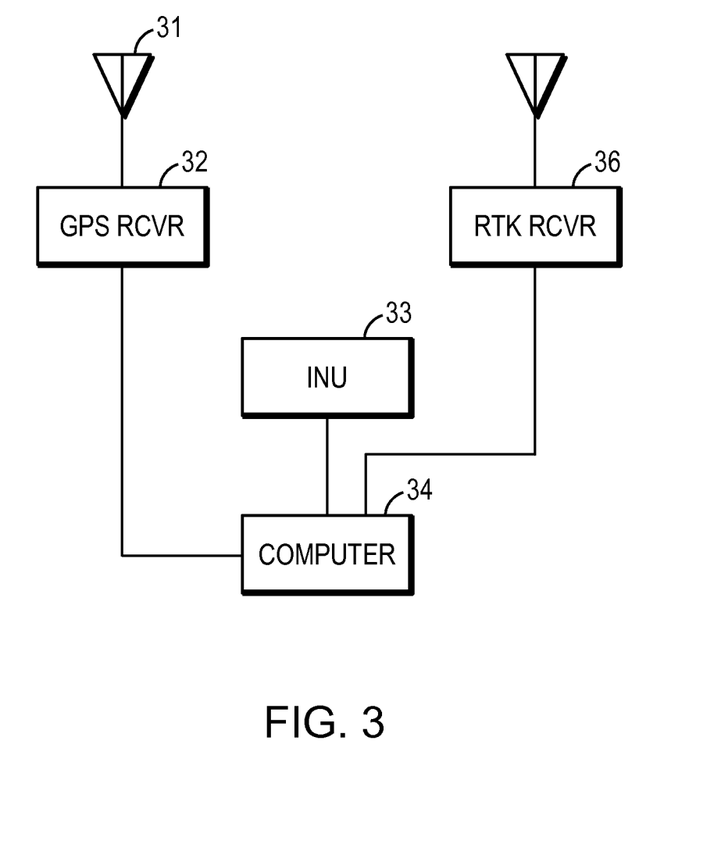
FIG. 3 is a diagram of a navigation unit carried on the aircraft for use in the system of FIG. 1.

With reference next to FIG. 3, the aircraft 10 carries a navigation unit comprising a GPS antenna 31, a GPS receiver 32, an INU 33, a computer 34 and an RTK receiver 36. The computer 34 uses the usual RTK procedures to enhance the position data provided by the GPS receiver 32 and to compute a vector 38 to the shipboard GPS antenna 19. In turn, the computer updates the INU 24 periodically with the enhanced GPS data. Although the relative accuracy of the update position at the remote is accurate to within 1 to 2 centimeters (typically), the absolute accuracy of the remotes update position has an accuracy of just 1 to 2 meters. This is reflected in the variance of the position used in the Kalman update. The output position of the inertial system at the remote is modified by a post-update position correction that restores the relative accuracy between the two moving systems to the centimeter level. The correction is computed by differencing the post-update base station position and the post-update rover position and subtracting this difference from the RTK vector used to generate the pre-update rover position.

With this arrangement, the RTK corrections to the GPS position of the aircraft provide the aircraft with an accurate position relative to the ship's GPS antenna. Accordingly the aircraft pilot (or a servo system controlling the aircraft), by virtue of the comparison of the INU 24 position data on the aircraft and the INU 22 data transmitted to the aircraft, has an accurate, low-latency distance from and bearing to the antenna 19 on the ship. The ship also calculates the parameters of a vector from the GPS antenna 19 to the landing pad 12. The aircraft uses this information, which is transmitted over the wireless link, to provide the aircraft with a vector to the landing pad 12.

What is claimed is:

1. A system for positioning an aircraft relative to a designated location on an ocean-going vessel, the system comprising:
    A. a shipboard navigation unit comprising:
        1. a first GPS antenna,
        2. a first GPS receiver for processing signals from the first GPS antenna,
        3. a first inertial navigation unit (INU) configured to receive periodically updated data generated by said first GPS receiver, at a rate that minimizes INU error;
        4. a transmitter for transmitting over a wireless link, shipboard GPS data and INU data;
    B. an aircraft-based navigation unit comprising:
        1. a second GPS antenna,
        2. a second GPS receiver for processing signals received from the second GPS antenna,
        3. a second INU configured to receive periodically updated data based on updated data from the first INU and an RTK moving baseline vector determined using data from the first and second GPS receivers, with the data from the first and second GPS receivers, the updated data from the first INU and the RTK moving baseline vector all having a same time tag,
        4. a receiver for receiving signals from said shipboard navigation unit, said signals being transmitted over the link by the transmitter,
        5. an RTK arrangement configured to generate the RTK moving baseline vector from the first GPS antenna to the second GPS antenna, said RTK arrangement further configured for
            determining a post-update correction vector for the RTK baseline vector based on post-update first INS and second INS position information and using the post-update correction vector to determine a post-update inertial position correction; and
        6. the aircraft INU further configured to update its output with the post-update inertial position correction and to compute a position vector of high accuracy from the aircraft INU to a designated location on the vessel.

2. The system defined in claim 1 wherein the shipboard navigation unit is further configured for generating a second vector from the first GPS antenna to the designated location, and transmitting the data for generating said second vector to the aircraft which generates a position vector from the aircraft to a landing pad.

3. The system defined in claim 2 including a Kalman filter that is configured to update the parameters of the second inertial unit.

4. The system of claim 1 wherein the output position of the aircraft navigation unit is calculated using a Kalman filter.

5. The system of claim 4 wherein the aircraft navigation unit is configured to correct the output position of the inertial system in the aircraft using the post-update inertial position correction to restore relative accuracy between the shipboard system and the aircraft system.

6. The system of claim 5 wherein the aircraft navigation unit is configured to compute said post-update inertial position correction by differencing a post-update position of the vessel and a post-update position of the aircraft, and subtracting this difference from said RTK moving baseline vector.

7. The system of claim 1 wherein the RTK moving baseline vector between the vessel and the aircraft is calculated using actual measurements that correspond to the same time tag at the second receiver and the first receiver, respectively.

8. The system of claim 7 wherein the aircraft navigation unit is configured to update a Kalman filter at a time that accommodates latency in the calculated measurements.

9. The system of claim 8 wherein the aircraft navigation unit is configured to update the Kalman filter to ensure said measurements have the same time tag.

10. The system of claim 1 wherein the aircraft navigation unit is configured to utilize the RTK moving baseline vector to determine an accurate position relative to said first GPS antenna onboard said vessel.

11. The system of claim 1 wherein a computer on the aircraft is configured to compare inertial navigation unit position data on the aircraft to inertial navigation unit position data transmitted to the aircraft from the vessel, to determine a low latency distance from and bearing to the GPS antenna on board said vessel from the aircraft.

12. The system of claim 1 wherein said navigation system on board said vessel is further configured to calculate information including parameters of a vector from the first GPS antenna to designated location, which is a landing pad.

13. The system of claim 12 wherein said information is transmitted over said wireless link from the vessel to the aircraft.

14. The system of claim 13 wherein the aircraft uses said information to provide the aircraft with a vector to a landing pad on the vessel.

15. A system for positioning an aircraft relative to a designated location on an ocean-going vessel, the system comprising:
    A. on the vessel, a navigation unit including:
        1. a first GPS receiver configured to receive and process signals received over a first GPS antenna, thereby to provide periodic position data;
        2. a first inertial navigation unit (INU) configured to received periodically updated data generated by said first GPS receiver at a rate that minimizes INU error, relating to the position of the vessel;

3. a transmitter that transmits over a wireless link to an associated aircraft, the position data generated by the first GPS receiver and the first INU; and B. in the aircraft, a navigation unit including:
1. a second GPS receiver configured for receiving and processing GPS signals received over a second GPS antenna,
2. a second INU having an output that is updated in accordance with periodically updated data that are based on updated data from the first INU and an RTK moving baseline vector determined using data from the first and second GPS receivers, the updated data from the first INU and the RTK moving baseline vector being associated with times at which measurements are available at the GPS receivers,
3. a receiver adapted to receive signals transmitted over the wireless link by the transmitter in the navigation unit on the vessel,
4. an RTK arrangement configured to process the GPS data to generate the RTK moving baseline vector from the second antenna to the first antenna, and said RTK arrangement being further configured for differencing a post-update remote position at the aircraft based on second INS data with a post-update base station position on the ship based on first INS data to produce a correction vector and subtracting the correction vector from the RTK moving baseline vector to obtain a post-update inertial position correction, and
5. the aircraft INU being further configured to update its output with said post-update inertial position correction and to compute a position vector of high accuracy to guide the aircraft for landing at a designated location on the vessel.

16. The system of claim 15 further comprising:
said navigation unit on said aircraft being further configured for comparing inertial navigation unit position data on the aircraft to inertial navigation unit position data transmitted to the aircraft from the vessel, to determine a low latency distance from and bearing to the GPS antenna on board said vessel from the aircraft.

17. The system of claim 15 wherein said aircraft comprises a helicopter.

18. The system of claim 15 wherein
the designated location is a landing pad,
said navigation system on board said vessel is further configured to calculate information including parameters of a vector from the first GPS antenna to the landing pad, and
said aircraft navigation system uses the parameters to guide the aircraft to the landing pad.

19. A system comprising
on a ship, a first navigation unit comprising:
a first satellite signal receiver that processes signals received by a first antenna;
a first inertial navigation unit (INU) that is updated using data that are provided by the first satellite signal receiver and associated with a given time tag;
a transmitter for transmitting satellite signal and INU information;
on an aircraft, a second navigation unit comprising:
a second satellite signal receiver that process signals received by a second antenna;
an RTK sub-system configured to use data from the first and second satellite receivers to determine an RTK moving baseline vector between the first antenna and the second antenna, the RTK moving base line vector being associated with the given time tag;
a second INU that is periodically updated based on the RTK moving baseline vector and the updated data from the first INU; and
one or more processors configured to produce a post-update inertial position correction based a correction calculated for the RTK moving baseline vector using post-update data from the first and second INUs, and to update the output position of the second navigation unit with the post-update inertial position correction to restore relative accuracy between the shipboard and the aircraft navigation units and produce a corrected relative aircraft position.

20. The system of claim 19 further including
in the first navigation unit, one or more processors configured to produce a vector from the first antenna to a predetermined landing pad; and
in the second navigation unit, one or more processors configured to determine a vector from the corrected position of the aircraft to the landing pad based on the vector from the first antenna to the landing pad.

21. The system of claim 20 wherein the post-update inertial position correction is determined by
differencing a post-update position of the aircraft that is based on data from the second INU with a post-update position of the vessel that is based on data from the first INU to obtain a second vector that is the correction for the RTK moving baseline vector, and
subtracting the second vector from the RTK moving baseline vector.

22. A navigation system consisting of
a ship navigation subsystem including
a first GPS receiver and associated first GPS antenna, the first GPS receiver periodically determining GPS position data relating to the first GPS antenna;
a first INU configured to use the position data determined by the first GPS receiver to update inertial positions and between updates determines post update inertial positions based on INU sensor data;
a transmitter that transmits the GPS position data and the inertial positions to a remote navigation subsystem;
the remote navigation subsystem including
a second GPS receiver and associated second GPS antenna, the second GPS receiver periodically determining GPS position data relating to the second GPS antenna;
an RTK processor configured to use the GPS position data determined by the first and second GPS receivers to determine enhanced positions of the second GPS antenna and associated baseline vectors between the first and second GPS antennas;
a second INU configured to use the enhanced positions to update inertial positions and between updates determine post-update inertial positions based on INU sensor data;
the RTK processor further configured to determine a baseline correction vector based on the post-update inertial positions of the first and second GPS antennas, the RTK processor configured to use the baseline correction vector to correct the post-update positions determined by the second INU.

* * * * *

UNITED STATES PATENT AND TRADEMARK OFFICE
CERTIFICATE OF CORRECTION

| | | |
|---|---|---|
| PATENT NO. | : 8,949,011 B2 | Page 1 of 1 |
| APPLICATION NO. | : 11/520212 | |
| DATED | : February 3, 2015 | |
| INVENTOR(S) | : Tom Ford et al. | |

It is certified that error appears in the above-identified patent and that said Letters Patent is hereby corrected as shown below:

Title Page, item (75), Inventors name should read:
Michael Bobye

In the Specification

Col. 2, line 66 should read:
craft. In order to obtain an accurate translation vector, an Col. 3, line 21 should read:
RTK translation vector is applied to the filtered INS estimate Col. 4, line 18 should read:
(base position and linking vector) have the same time tag.

Col. 4, line 21 should read:
once every 30 seconds or so. The transmitted position is usu- Col. 4, line 56 should read:
ings but at a rate that is too low for the operations contem- Col. 5, line 7 should read:
computer updates the INU 33 periodically with the enhanced Col. 5, line 10 should read:
(typically), the absolute accuracy of the remote's update posi- Signed and Sealed this
Twenty-third Day of June, 2015

Michelle K. Lee
*Director of the United States Patent and Trademark Office*